United States Patent [19]

Kuwana et al.

[11] Patent Number: 5,249,729
[45] Date of Patent: Oct. 5, 1993

[54] METHOD FOR FORMING HOOK ENGAGING PART IN THERMAL PART OF MATERIAL FOR VERTICAL SUSPENSION TYPE SURFACE TREATMENT

[75] Inventors: Jingo Kuwana, Toyama; Katsuyuki Nagata, Uozu, both of Japan

[73] Assignee: Yoshida Kogyo K. K., Tokyo, Japan

[21] Appl. No.: 998,588

[22] Filed: Dec. 30, 1992

[30] Foreign Application Priority Data

Dec. 30, 1991 [JP] Japan .................................. 3-360381

[51] Int. Cl.$^5$ .............................................. B23K 31/00
[52] U.S. Cl. ..................................... 228/125; 228/155;
228/176
[58] Field of Search .............. 228/101, 125, 155, 176, 228/19, 26, 57; 269/46, 91, 315, 909

[56] References Cited

U.S. PATENT DOCUMENTS 3,729,125  4/1973  Hano ..................................... 228/26

FOREIGN PATENT DOCUMENTS

55-0119  2/1980  Japan .
55-6120  2/1980  Japan .
6157916  6/1983  Japan .

Primary Examiner—Samuel M. Heinrich
Attorney, Agent, or Firm—Hill, Steadman & Simpson

[57] ABSTRACT

A method for forming on materials subjected to vertical suspension type surface treatment such hook engaging parts as to be engaged with nipping devices of a carrier bar serving to convey the materials successively to a series of surface-treating baths is disclosed. This method is characterized in that the formation of a protuberant hook engaging part is effected by welding on the surface of the terminal part of the material under treatment while the material is in transit to a framing station. The welding can be carried out by keeping the material under treatment moved on a conveyor or keeping a welding machine moved along the conveyor. The formation of a protuberant hook engaging part can be accomplished by keeping a conductor wire supplied to the site of welding and continuously welding the wire to the lower surface of the terminal part of each of the plurality of materials under treatment thereby forming a hook engaging part made of conductor wire on each of the materials or by welding bead of the shape of a dot or line on the lower surface and/or the upper surface of the terminal part of the material under treatment to form a hook engaging part made of the ridged bead.

12 Claims, 5 Drawing Sheets

METHOD FOR FORMING HOOK ENGAGING PART IN THERMAL PART OF MATERIAL FOR VERTICAL SUSPENSION TYPE SURFACE TREATMENT

BACKGROUND OF THE INVENTION

1. Field of the Invention

This invention relates to a method for forming hook engaging parts in terminal parts of materials for the vertical suspension type surface treatment while the materials are in transit to a framing station. More particularly, this invention relates to a method for forming in the terminal parts of the materials such hook engaging parts as to be engaged with nipping devices of a carrier bar serving to convey the materials as vertically suspended therefrom successively through a series of surface-treating baths.

2. Description of the Prior Art

Figure 1:
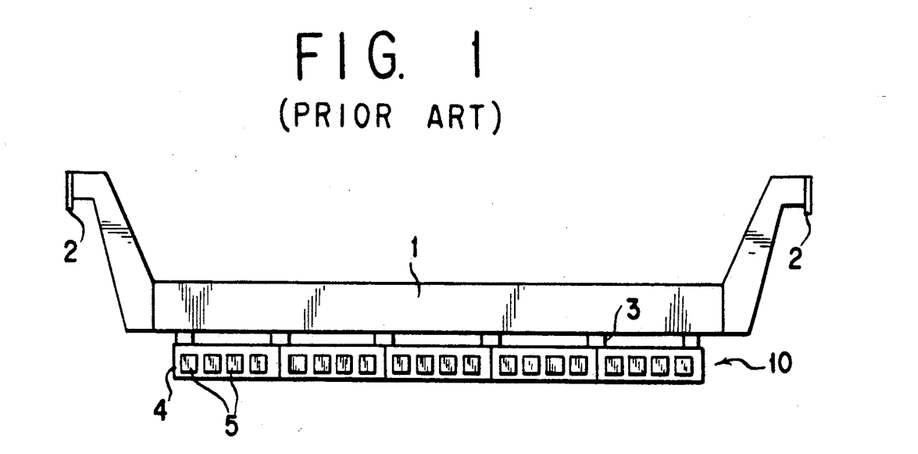
FIG. 1 is a schematic front view of a conventional carrier bar for racking materials used in the method for surface-treating the materials in a vertically suspended state.

It is widely known that as a measure to surface-treat such long materials as extruded profiles of aluminum, the method of vertical suspension type surface treatment which comprises vertically suspending materials under treatment from a carrier bar 1 provided at the opposite terminal parts thereof with electrode contacts 2 as illustrated in FIG. 1 and causing the carrier bar to convey the materials successively through a series of surface-treating baths such as degreasing bath, rinsing bath, and electrolytic bath and dip them severally in these surface-treating baths to consequently form an anodic oxide film and a colored oxide film thereon has been developed and adopted for actual use. Heretofore, since the work of attaching the materials yet to be treated to the carrier bar 1 on the loading side for supplying the materials has consisted of attaching suspending jigs capable of nipping a given object after the fashion of a clip, one each to the materials under treatment, and then hooking the suspending jigs one each on the conducting bars disposed on the lower surface of the carrier bar 1 along the longitudinal direction thereof, it necessitates appreciable amounts of time and labor. Further this work is extremely complicate and is deficient in efficiency because it is destined to handle a large number of materials. Thus, for a plant specializing in surface treatment, the work has constituted itself a major obstacle to the series of rationalizing steps taken to fulfill the most important tasks of saving labor and enhancing efficiency.

Further, the work of racking the materials under treatment by the use of the conventional suspending jigs has consisted solely in causing the suspending jigs to take hold of these materials by nipping their leading terminal parts after the fashion of a clip, it entails the possibility of the seized materials accidentally slipping off the suspending jigs when the carrier bar is raised upright to suspend the materials in a vertical direction or when the carrier bar is raised or lowered for the purpose of conveyance to the surface-treating baths or immersion in the baths. The fact that the suspending jigs are incapable of generating an ample nipping and retaining force possibly entails the phenomenon of impairing electric conduction during the electrolytic treatment.

Figure 2:
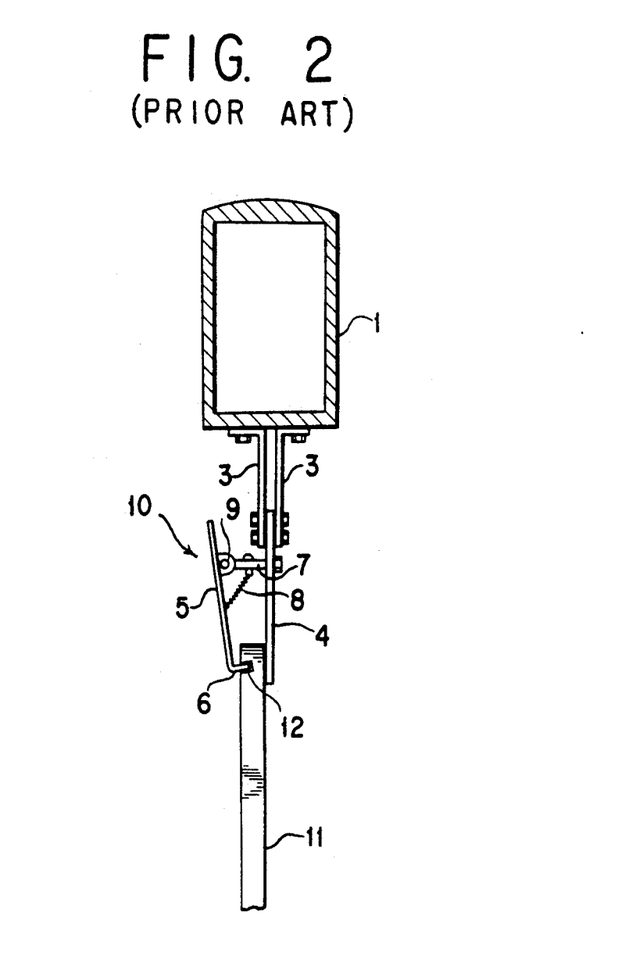
FIG. 2 is a partially sectioned side view illustrating the state of engagement between the conventional hook engaging part formed in the terminal part of the material under treatment and a nipping device of the carrier bar.

For the purpose of solving these problems, Japanese Patent Publications No. 55-6119 (6,119/1980) and No. 55-6120 (6,120/1980) propose a method for racking the materials under treatment by forming a notch 12 in the terminal part of each material 11 under treatment in mid course of the conveyance on a conveyor disposed immediately in front of a framing station and causing a hooking part 6 formed at the leading terminal of a depressing member 5 (or a supporting plate 4) of a material nipping device (suspending jig) 10 to be hooked in the notch 12 as illustrated in FIG. 2. The teachings of said patent literatures are hereby incorporated by reference. To be specific, as illustrated in FIG. 1 and FIG. 2, for example, the racking of the material 11 under treatment on a carrier bar 1 is performed by using a nipping device (suspending jig) 10. The suspending jig 10 comprises a conductive supporting plate 4 whose upper end is nipped and secured between the lower terminal parts of a pair of L-shaped suspending metal pieces 3, 3 attached fast to the lower surface of the carrier bar 1, a supporting member 7 provided projectingly on the supporting plate 4, and a depressing member 5 rotatably attached through the medium of an axial pin 9 to the leading terminal part of the supporting member 7, the leading terminal of the depressing member 5 being bent to form a hooking part 6. The retention of the material 11 by the suspending jig 10 in the nipped state is effected by allowing the hooking part 6 to be engaged with the notch 12 of the material 11 and causing the hooking part 6 of the depressing member 5 to be pressed against the supporting plate 4 by means of a spring 8 adapted to interconnect the depressing member 5 and the supporting plate 4.

The patent publications mentioned above further disclose a racking apparatus which is capable of automatically racking the materials under treatment to the carrier bar 1 by leveling down the carrier bar 1 toward the loading side for supplying the materials 11 under treatment, causing the notch 12 to be formed in the terminal part of the material 11 while the material is in transit in the lateral direction toward the carrier bar 1, allowing the hooking part 6 at the leading terminal of the depressing member 5 of the nipping device 10 fixed to the carrier bar 1 to engage with the notch 12, then raising the carrier bar 1 upright by a tumbler lifter, and loading it on the conveyor. The materials 11 suspended by the carrier bar 1 are forwarded by the conveyor successively to the series of surface-treating steps such as the step for rinsing with water and the step for electrolysis.

The racking method disclosed in said Japanese Patent Publications No. 55-6119 and No. 55-6120 indeed fulfill the requirement for enhancing the efficiency of the racking work and preventing the possible accidental fall of the materials under treatment. The mere automation of the racking step, however, does not always lead to full automation of the whole operation ranging from the step of extrusion through the step of surface treatment. The racking step, therefore, requires automation which is incapable of obstructing the flow of operation from the stop of extrusion through the step of surface treatment.

The automation of the racking step dictates the precondition of ensuring racking of materials of varying sizes all together and allowing insertion of suitable intervals between the materials proportionately to their sizes (peripheral length, height, and width) for the sake of uniformizing the thicknesses of an oxide film and an applied coating and the coloration in the course of the surface treatment and, therefore, allowing free alteration of the pitch between the adjacent materials suspended by the carrier bar. The necessary alteration in the pitch during the conveyance of materials on the conveyor to the framing station necessitates a method for varying the speed of both or either of the feed conveyor and the arranging conveyor. To be specific, the automation of the racking operation requires (A) adjustment to the pitch designated for the materials of a particular shape, (B) adoption of a jig mechanism capable of allowing free alteration in the pitch, and (C) fabrication of the materials in the particular shape fit therefor.

The racking method disclosed in Japanese Patent Publications No. 55-6119 and No. 55-6120 mentioned above fulfills the requirements (A) to (C) mentioned above as the preconditions for the automation of the racking step and avoids accidental fall of the materials under treatment and, therefore, is incapable of entailing various problems due to the unexpected fall of a material (when a material is suffered to fall into any of the baths in the line of surface-treating process, it will remain upright or aslant in the bath and stand in the way of subsequent materials being conveyed along the line of process).

In the method disclosed in the patent publications mentioned above, however, the formation of the notch in the material is accomplished by the operation of a rotary blade performed on the material being temporarily seized with a seizing device at a point along the length of the conveyor. Thus, the automation of the entire line of operation is difficult to attain because this formation of the notch interferes with the flow of the line from the step of extrusion through the step of surface treatment.

Since the work of forming the notch in the material is carried out at the framing station of the raw material station preceding the supply of materials to the framing station, it has the problem of producing chips from the formation of the notch in the material and consequently suffering the chips to adhere to the material and inflict damage thereto, inducing scatter of chips during the erection of the carrier bar with the tumbler lifter, and consequently suffering the chips to drift and jeopardize the work environment and further suffering the chips to fall into and pile up in the baths (as for degreasing and rinsing with water) in the line of operation and consequently degrade the quality of the baths.

The aforementioned method further has the problem of being unable to frame materials of the shape of a flat or a strip because the rotary blade is incapable of inserting a notch in such materials.

SUMMARY OF THE INVENTION

An object of this invention, therefore, is to solve the problems of the prior art described above and provide a method for forming a hook engaging part on the materials subjected to vertical suspension type surface treatment by a comparatively simple procedure with high operational efficiency, which method allows the materials under treatment to be securely racked on a nipping device or a suspending jig in such a manner as to preclude the occurrence of troubles due to accidental fall of a material and enables the step of racking to be automated without posing any obstruction to the flow of the line of operation from the step of extrusion through the step of surface treatment.

Another object of this invention is to provide a method for forming a hook engaging part on the materials subjected to vertical suspension type surface treatment, which method allows the racking of the materials under treatment to the nipping device to be carried out quickly, securely, and easily with freedom of alteration in the pitch between the materials suspended by a carrier bar.

Still another object of this invention is to provide a method for forming a hook engaging part on the materials subjected to vertical suspension type surface treatment without entailing the troubles of the conventional method such as the occurrence of chips of cutting during the formation of a notch, the adhesion of the produced chips to the materials under treatment and the consequent infliction of damage thereto, the jeopardization of the work environment due to the drift of the chips, and accumulation of the chips in the baths in the line of surface-treating operation, and the deterioration of quality of the baths.

A further object of this invention is to provide a method for forming a hook engaging part on the materials subjected to vertical suspension type surface treatment, which method can be applied to materials of all shapes without reference to size, wall thickness, etc.

To accomplish the objects described above, in accordance with the present invention, there is provided a method for forming a hook engaging part on materials subjected to vertical suspension type surface treatment, which method is characterized in that a protuberant hook engaging part is formed by welding on the surface of the terminal part of said material under treatment while said material is in transit to a framing station.

The welding can be carried out by keeping the material under treatment moved on a conveyor or keeping a welding device moved along the conveyor. The formation of a protuberant hook engaging part can be accomplished by keeping a conductor wire supplied to the site of welding and continuously welding the wire to the lower surface of the terminal part of each of a plurality of materials under treatment thereby forming a hook engaging part made of conductor wire on each of the materials or by welding bead of the shape of a line or dot on the lower surface and/or the upper surface of the terminal part of the material under treatment to form a hook engaging part made of the ridged bead.

DETAILED DESCRIPTION OF THE PREFERRED EMBODIMENTS

Figure 3:
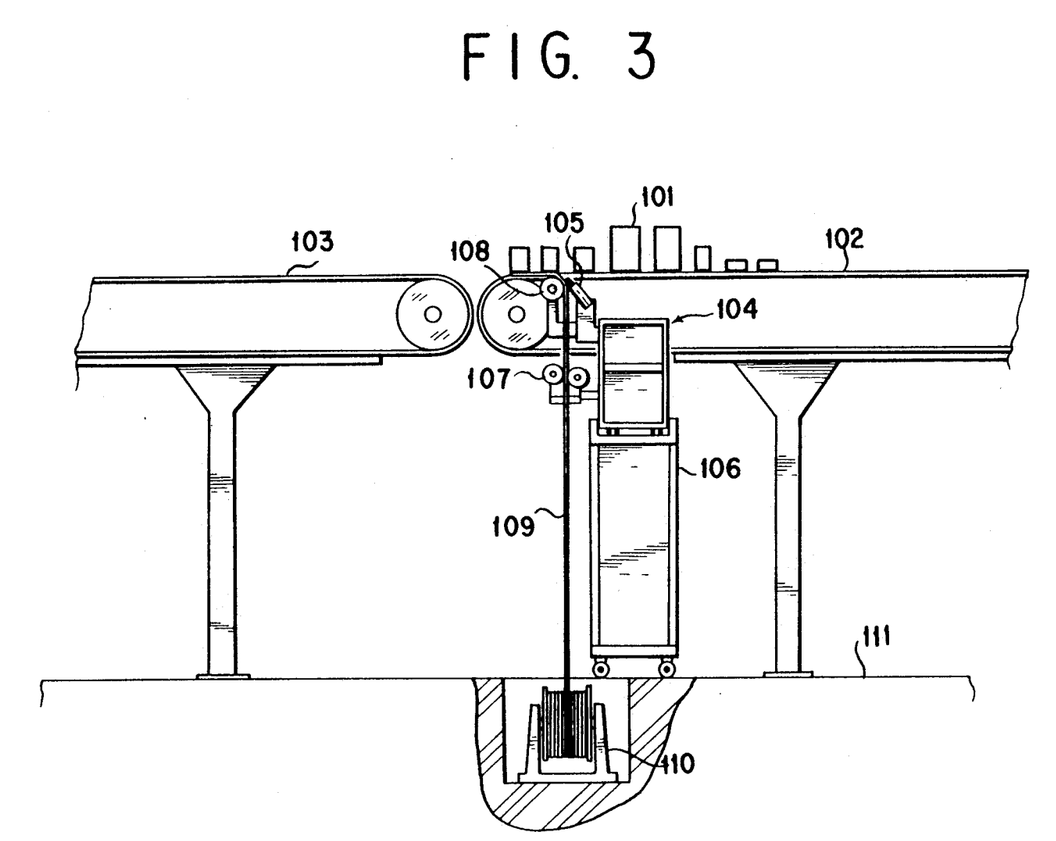
FIG. 3 is a schematic side view illustrating one example of the method for forming a hook engaging part on the material for vertical suspension type surface treatment contemplated by the present invention.

FIG. 3 depicts the manner in which a conductor wire 109 (such as, for example, a round wire or an angular wire of aluminum) is welded to the lower surface of the terminal part of the material 101 under treatment in transit. While materials 101 under treatment are arranged on an arranging conveyor 102 and slowly moved by the arranging conveyor 102, a conductor wire 109 unwound from a conductor wire supply device 110 and fed by a pair of feed rollers 107 is applied to the lower surface of the terminal part of the material 101 protruding from the arranging conveyor 102. Then, a welding machine 104 is operated to weld the conductor wire 109 to the lower surface of the terminal part of each of the plurality of materials 101. Reference numeral 108 stands for a feed roller of the welding part. The welding machine 104 is set on a wheeled cart 106 in such a manner as to be freely moved in the direction perpendicular to the arranging conveyor 102. Thus, a welder head 105 can move closely to the terminal part of the material 101 under treatment and the welding position can be set as desired. The wheeled cart 106 itself is placed on a floor surface 111 in such a manner as to be freely moved in the longitudinal direction of the arranging conveyor 102. Thus, the wheeled cart 106 is capable of moving the welding machine 104 along the arranging conveyor 102 and simultaneously causing it to perform the welding work for the purpose of expediting the welding operation. Generally, however, the welding machine 104 is fixed in place and caused to perform the welding work on the materials which are being advanced along the welding machine 104 as carried on the arranging conveyor 102. The conductor wire supply device 110 is installed under the floor surface so as to avoid interfering with the motion of the wheeled cart 106. It may be installed instead on the floor surface or attached to the wheeled cart 106 as occasion demands. The materials 101 under treatment having the conductor wire 109 welded to the lower surface of the terminal part thereof as described above is then forwarded by a high-speed conveyor 103 to the racking apparatus.

The lower surface of the material 101 under treatment which is conveyed as placed on the conveyor 102 as described above forms a flat surface of fixed level. Thus, the conductor wire 109 can be easily welded to the lower surface irrespectively of the size and wall thickness of the material under treatment. In the place of the method for welding the conductor wire as illustrated in FIG. 3, a welding rod may be used to weld ridged beads in the form of dots or lines on the surface. When the conductor wire is welded, the portions of the conductor wire interconnecting and intervening between the adjacent materials must be removed by insertion of cuts or exertion of shocks during the removal of a frame. The welding of such ridged beads as mentioned above has no use for this extra work of cutting the wire and, therefore, proves to be advantageous.

As the method for effecting the welding under discussion, hot wire welding, TIG welding, MIG welding, laser welding, etc. may be adopted.

When the welding with the conductor wire is performed on the materials under treatment which are being advanced as carried on a feed conveyor, the portions of the conductive wire which have escaped being welded to the materials and is now intervening between the adjacent materials are removed by cutting before the materials are supplied to the arranging conveyor. When the welding is performed on the materials carried on the arranging conveyor, the removal of the intervening portions of the conductor wire is effected either on the arranging conveyor after the welding or after the materials have been surface-treated and relieved of the frame. When the welding of beads is selected, it may be performed on the materials carried on the feed conveyor or on the arranging conveyor. In the case of the welding using the conductor wire, the portions of the conductor wire interconnecting and intervening between the adjacent materials under treatment must be removed as mentioned above. When this removal is made by cutting, the chips which are produced by the cutting are drifted and suffered to adhere to the materials under treatment and inflict damage thereto. Thus, it is wise to avoid making the removal by the cutting. The removal, therefore, is desired to be effected by pressing, shearing, etc. Optionally, the framing station may be installed behind and connected to the heat-treating furnace which follows the site of extrusion so as to obviate the necessity for a pallet.

Figure 4:
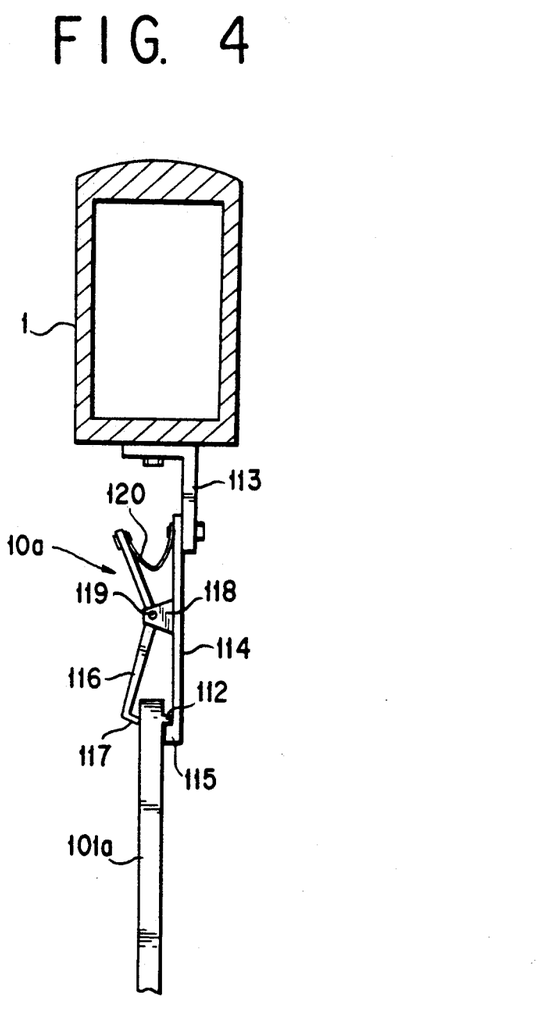
FIG. 4 is a partially sectioned side view illustrating one example of the racking operation performed by the use of the nipping device for the material having a hook engaging part formed thereon in accordance with this invention.

An example of the racking work to be performed on the materials under treatment to which the conductor wire has been welded as described above is illustrated in FIG. 4. The racking is effected by causing the hooking part 115 of the nipping device 10a to be hooked on a hook engaging part 112 which is formed of a conductor wire as set in place on the lower surface of the terminal part of the material 101a. To be more specific, the material 101a is nipped fast between a hooking part 115 formed by bending the leading terminal of a supporting plate 114 supported by an L-shaped metal piece 113 fixed to the lower surface of the carrier bar 1 and a leading terminal part 117 of a depressing member 116 rotatably attached through the medium of an axial pin 119 to a supporting member 119 formed projectingly on the supporting plate 114 by causing the hooking part 115 to be hooked on the hook engaging part 112 of the material 101a mentioned above and, at the same time, causing the leading terminal part 117 of the depressing member 116 to be pressed against the material 101a by means of a leaf spring 120.

Figure 5:
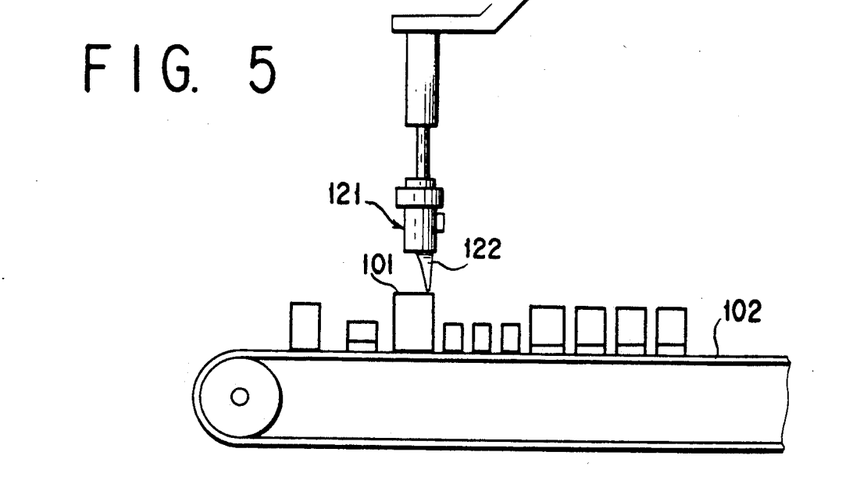
FIG. 5 is a schematic side view illustrating still another example of the method of this invention.
Figure 6:
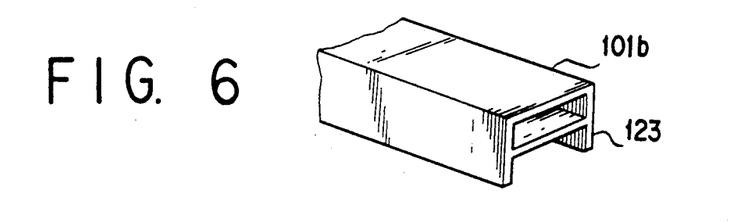
FIG. 6 is a partial perspective view illustrating another example of the material under treatment.

FIG. 5 illustrates the manner in which the hook engaging part is formed by welding ridged beads on the materials under treatment in conveyance. To be more specific, a welder head 122 of a welding machine 121 set in place above the materials 101 under treatment which are conveyed as arranged on the arranging conveyor 102 is moved vertically in conformity with the particular shape of each of the materials 101 and operated to weld ridged bead in the form of a line or dots on the upper surface of the terminal part of each of the materials 101. The method of effecting the welding from above as described above is effectively adopted for the material 101b which is so shaped as to comprise a flat upper surface and fins 123 projecting downwardly as illustrated in FIG. 6. Optionally, the welding may be made from above as described above and additionally from below simultaneously so as to give rise to a hook engaging part which is composed of ridged weld beads deposited on the upper and lower surfaces of the terminal part of the material.

Figure 7:
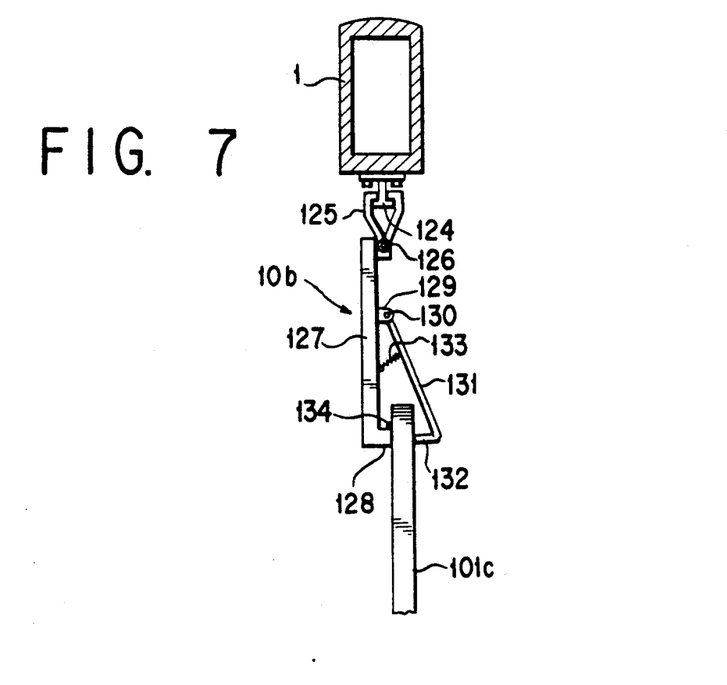
FIG. 7 is a partially sectioned side view illustrating another example of the racking operation performed by the use of another nipping device for the material under treatment having a hook engaging part formed thereon in accordance with the present invention.

FIG. 7 illustrates an example of the work of racking the material under treatment as illustrated in FIG. 6 with the nipping device which is constructed in a staggered pattern.

To be more specific, a protuberant hook engaging part 134 made of a ridged weld bead is formed on the upper surface of the terminal part of the material 101c under treatment. Then, the material 101c is nipped fast between the hooking part 128 at the leading terminal of the supporting plate 127 and the leading terminal part 132 of the depressing member 131 by placing the supporting plate 127 on the upper surface of the material 101c causing the hooking part 128 at the leading terminal of the supporting plate 127 to be hooked on the hook engaging part 134 mentioned above, and causing the leading terminal part 132 of the depressing member 131 to be pressed against the material 101c by means of a spring 133. The depressing member 131 is rotatably attached through the medium of an axial pin 130 to a supporting member 129 formed projectingly on the supporting plate 127. In the case of the example illustrated in FIG. 7, a suspending metal piece 125 of the shape of a fork is attached in a fit-in fashion to a swelled terminal part of a supporting metal piece 124 which has a pin-like cross section and is attached to the lower surface of the carrier bar 1 and the upper terminal part of the supporting plate 127 is rotatably attached to the lower terminal part of the suspending metal piece 125. The design of the supporting device may be freely altered to suit the occasion.

Figure 8:
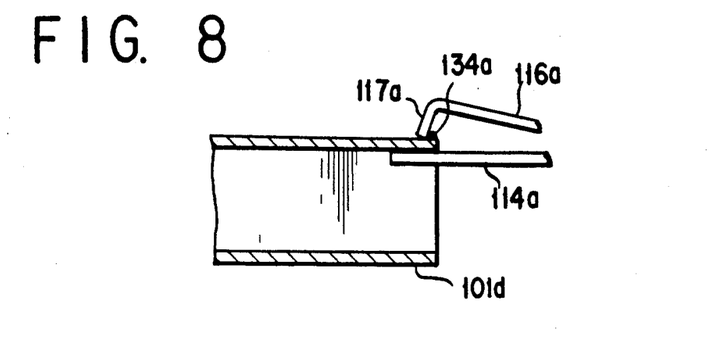
FIG. 8 is a partially sectioned side view illustrating one example of the state of engagement established between the material under treatment having a hook engaging part formed on the terminal edge thereof in accordance with this invention and the nipping device of the carrier bar.
Figure 9:
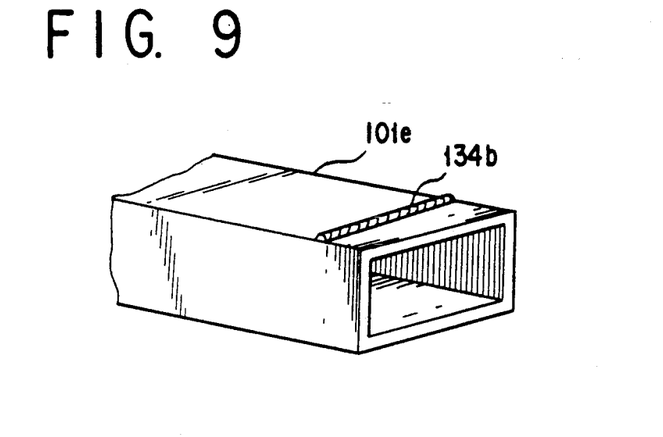
FIG. 9 is a partial perspective view illustrating another example of the formation of a hood engaging part in accordance with this invention.
Figure 10:
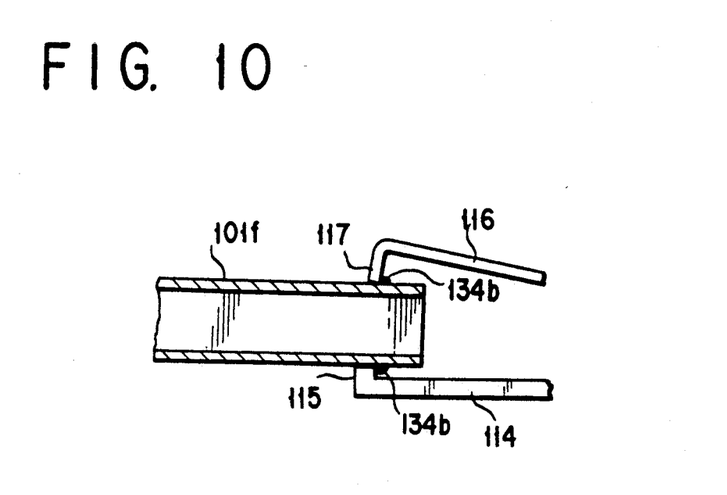
FIG. 10 is a partially sectioned side view illustrating an example of the state of engagement established between the material under treatment having hook engaging parts formed on both upper and lower surfaces in the terminal part thereof in accordance with this invention and the nipping device of the carrier bar.

FIGS. 8 to 10 illustrate alterations of the hook engaging part and the method of engagement thereof with the nipping device. FIG. 8 represents a case in which the hook engaging part 134a is formed on the upper terminal edge of a hollow material 101d under treatment and the supporting plate 114a formed in the shape of a flat plate is inserted into the material 101d and the hooking part 117a is formed by bending the leading terminal part of the depressing member 116a in the shape of the letter L so that the material 101d is nipped fast by causing the hooking part 117a of the depressing member 116a to be hooked on the hook engaging part 134a and, at the same time, pressed against the upper terminal edge of the material 101d. FIG. 9 represents a case in which the hook engaging part 134b is formed on the upper surface of the material 101e under treatment by having a weld bead deposited in a linear ridge at a fixed distance from the terminal edge of the material 101e. FIG. 10 represents a case in which two hook engaging parts 134b similar to that illustrated in FIG. 9 are formed one each at a fixed distance from the terminal edges of the upper and lower surfaces of the material 101f under treatment and the material 101f is nipped fast between the hooking part 115 of the supporting plate 114 of the nipping device illustrated in FIG. 4 and the hooking part 117 at the leading terminal of the depressing member 116 by causing these hooking parts 114 and 117 to be simultaneously hooked on the hook engaging parts 134b and pressed against the material.

As described above, the method for forming the hook engaging part on the material for vertical suspension type surface treatment contemplated by this invention consists in forming a protuberant hook engaging part by welding. The work, therefore, can be performed on the material which is being conveyed to the framing station and it has no possibility of interfering with the flow of the line from the step of extrusion through the step of surface treatment. Further, since the formation of the hook engaging part is effected by the method of welding, it can be effectively applied to materials of all shapes irrespectively of size, wall thickness, etc. without entailing the possibility of giving rise to chips of the kind produced in the insertion of a notch involved in the conventional method. Further, since the hook engaging part is formed of a conductive substance, it has no possibility of impairing the conduction of electricity of degrading the quality of surface treatment.

Since the racking can be effected by causing the hooking part formed at the leading terminal of the depressing member or supporting plate of the nipping device to be hooked on the protuberant hook engaging part formed by the welding as described above, this racking work can be carried out quickly, securely, and easily. It imposes no limit on the pitch between the adjacent materials under treatment to be suspended by the carrier bar. It is further capable of uniformizing the thickness and color of the anodic oxide film to be formed in the treatment of anodic oxidation and the treatment of electrolytic coloration. This racking work also allows adoption of the conventional automatic racking device in its unmodified form.

Now, concrete working examples of this invention will be cited below.

EXAMPLE 1

Extruded materials of aluminum A-6063S loaded on a pallet were transferred onto a feed conveyor by the use of an unloading device, advanced as carried on the feed conveyor, and caused to be arranged as separated with a designated interval on an arranging conveyor by varying the speed of the arranging conveyor. Immediately before they were transferred onto a high-speed conveyor, an angular wire of A-6063S measuring 5 mm × 3 mm in cross section was supplied from below the arranging conveyor as illustrated in FIG. 3, applied to the extruded materials, and welded thereto by the use of a TIG welding machine to form protuberant hook engaging parts of the angular wire on the lower surfaces of the terminal parts of the materials. The TIG welding was performed under the conditions of AC 32 V, 150 A, a welding speed of 0.3 m/min. and a skip speed of 10 m/min. Then, the hook engaging part was framed by causing a hooking part of a framing jib (suspending jig) to be hooked thereon and a retaining jig (depressing member) pressed down thereon.

EXAMPLE 2

Hook engaging parts of ridged weld beads were formed on the upper surfaces of the terminal parts of the materials by following the procedure of Example 1, except that the site of welding was arranged on the feed conveyor and the MIG welding (no use found for a conductor wire) was carried out immediately before the materials were transferred onto the arranging conveyor. The MIG welding was performed under the conditions of AC 14 to 20 V, 150 A, a welding speed of 0.6 m/min. and a skip speed of 10 m/min.

From the foregoing detailed description, it will be evident that there are number of changes, adaptations, and modifications of the present invention which come within the province of those skilled in the art. However, it is intended that all such variations not departing from the spirit of the invention be considered as within the scope thereof as limited solely by the claims appended hereto.

What is claimed is:

1. A method for forming on a material subjected to vertical suspension type surface treatment such a hook engaging part as to be engaged with a nipping device of a carrier bar serving to convey said materials successively to a series of surface-treating baths, which comprises: forming a protuberant hook engaging part by welding on the surface of a terminal part of said material while said material is in transit to a framing station.

2. A method according to claim 1, wherein said welding is performed on said material while said material is being advanced by means of a conveyor.

3. A method according to claim 1 or 2, wherein said welding is performed on said material by having a welding machine moved along said material.

4. A method according to claim 1, wherein a conductor wire is continuously supplied to the site of welding and is welded to the lower surfaces of terminal part of a plurality of materials to form thereon hook engaging parts made of said conductor wire.

5. A method according to claim 1, wherein a ridged bead of the shape of a line or dot is welded to the lower surface and/or the upper surface of the terminal part of said material to form thereon a hook engaging part made of said ridged bead.

6. A method according to claim 1, wherein said welding is performed by hot wire welding, TIG welding, MIG welding, or laser welding.

7. A method for forming on materials subjected to vertical suspension type surface treatment such hook engaging parts as to be engaged with nipping devices of a carrier bar serving to convey said materials successively to a series of surface-treating baths, which comprises the steps of:

applying a conductor wire to the lower surface of the terminal part of the material protruding from a conveyor and continuously welding the wire to the lower surface of the terminal part of each of the plurality of materials which are conveyed on the conveyor while keeping the conductor wire supplied to the site of welding, and removing the portions of the conductor wire interconnecting and intervening between the adjacent materials thereby leaving a protuberant hook engaging part made of said conductor wire welded to the lower surface of each of said materials.

8. A method according to claim 7, wherein said conductor wire is a round or angular wire of aluminum.

9. A method according to claim 7, wherein removal of the conductor wire is effected by pressing or shearing.

10. A method for forming on materials subjected to vertical suspension type surface treatment such hook engaging parts as to be engaged with nipping devices of a carrier bar serving to convey said materials successively to a series of surface-treating baths, which comprises the steps of:

placing a welder head of a welding machine above said materials which are conveyed on a conveyor, and welding bead on the upper surface of the terminal part of each of said materials while moving said welder head vertically in conformity with the particular shape of each of said materials, thereby forming thereon a protuberant hook engaging part made of the ridged bead.

11. A method for forming on materials subjected to vertical suspension type surface treatment such hook engaging parts as to be engaged with nipping devices of a carrier bar serving to convey said materials successively to a series of surface-treating baths, which comprises the steps of:

placing a welder head of a welding machine under said materials which are conveyed on a conveyor, and welding bead on the lower surface of the terminal part of each of said materials thereby forming thereon a protuberant hook engaging part made of said ridged bead.

12. A method for forming on materials subjected to vertical suspension type surface treatment such hook engaging parts as to be engaged with nipping devices of a carrier bar serving to convey said materials successively to a series of surface-treating baths, which comprises the steps of:

placing welder heads of welding machines above and under said materials which are conveyed on a conveyor, and welding beads on the upper and lower surfaces of the terminal part of each of said materials while moving said upper welder head vertically in conformity with the particular shape of each of said materials, thereby forming thereon protuberant hook engaging parts made of the ridged beads.

* * * * *